United States Patent [19]
Ragazzini et al.

[11] 4,222,729
[45] Sep. 16, 1980

[54] SCREW EXTRUDER FOR THERMOPLASTIC SYNTHETIC FOAMS

[75] Inventors: Franco Ragazzini; Roberto Colombo, both of Turin, Italy

[73] Assignee: Lavorazione Materie Plastiche L.M.P. S.p.A., Turin, Italy

[21] Appl. No.: 10,285

[22] Filed: Feb. 7, 1979

[51] Int. Cl.² .............................................. B29F 3/08
[52] U.S. Cl. ................................ 425/378 R; 264/53; 366/144; 425/817 C
[58] Field of Search ............... 425/4 C, 817 C, 378 R; 264/51, 53, 54, 50; 366/144

[56] References Cited

U.S. PATENT DOCUMENTS

| | | | |
|---|---|---|---|
| 2,669,751 | 2/1954 | McCurdy et al. | 264/53 |
| 2,848,739 | 8/1958 | Henning | 425/4 C X |
| 3,151,192 | 9/1964 | Jacobs et al. | 264/53 |
| 3,286,992 | 11/1966 | Armeniades et al. | 261/79 A X |
| 3,310,617 | 3/1967 | Dygert et al. | 264/53 |
| 3,385,917 | 5/1968 | Breukink et al. | 264/51 |
| 3,391,051 | 7/1968 | Ehrenfreund et al. | 264/53 X |
| 3,427,371 | 2/1969 | Skinner | 425/4 C X |
| 3,538,203 | 11/1970 | Overcashier et al. | 264/53 |
| 3,751,377 | 8/1973 | Buckner | 264/53 X |
| 3,827,841 | 8/1974 | Kawai et al. | 425/4 C |
| 3,830,901 | 8/1974 | Winstead | 264/51 |
| 3,941,544 | 3/1976 | Barth | 425/817 C X |
| 3,954,365 | 5/1976 | Barth et al. | 425/817 C X |

FOREIGN PATENT DOCUMENTS

| | | | |
|---|---|---|---|
| 1600010 | 8/1970 | France | |
| 831699 | 3/1968 | Italy | |
| 48-18104 | 6/1973 | Japan | 425/817 C |
| 1231535 | 5/1971 | United Kingdom | |

*Primary Examiner*—Philip Anderson
*Attorney, Agent, or Firm*—Sughrue, Rothwell, Mion, Zinn & Macpeak

[57] ABSTRACT

A cooling/mixing device having no moving parts is interposed between the extrusion head and the screw barrel of the extruder. The device comprises a cooled metallic block having a pair of large opposed faces and a plurality of rows of through-passages interconnecting said faces. Inlet and outlet manifold channels for the melt extend along the rows of passages so that a lateral wall of a manifold channel is formed by its respective face of the block. Partial flows of melt obtained from the flow in the inlet manifold channel are individually cooled in the passages and emerge from the latter substantially perpendicularly to the outlet flow in the output manifold channel to produce turbulent mixing. Preferably a further similar cooling block is provided, acting in series with the first block. The blocks are preferably in form of cylindrical sleeves with through-passages directed radially while the manifold channel are directed axially at the inside and at the outside of the sleeves.

8 Claims, 5 Drawing Figures

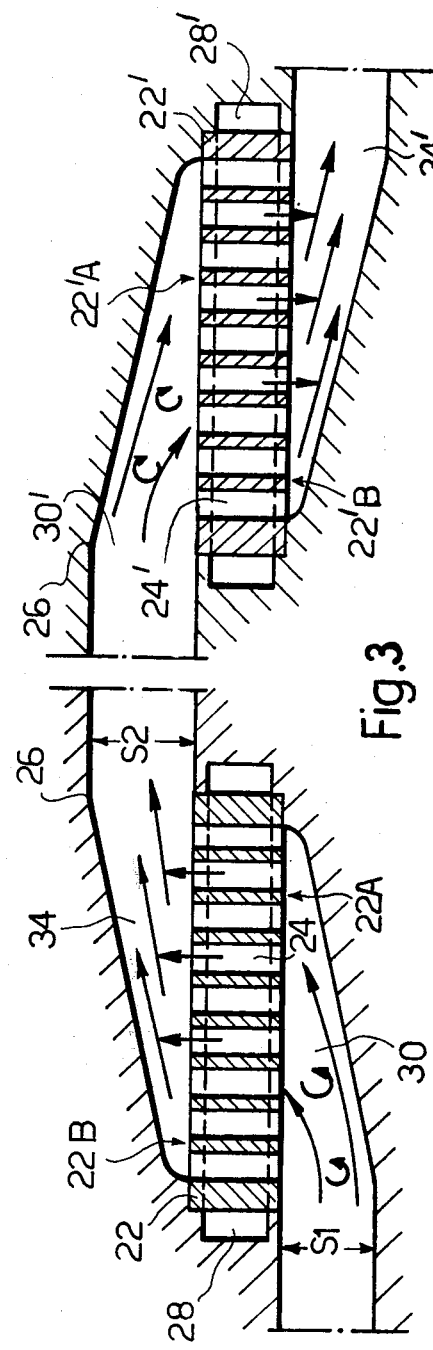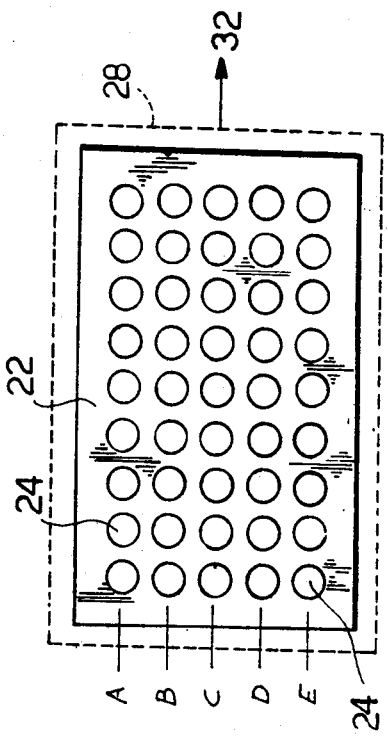

SCREW EXTRUDER FOR THERMOPLASTIC SYNTHETIC FOAMS

FIELD OF THE INVENTION

The present invention relates to the manufacture of extruded articles (e.g. sheets or tubes) of thermoplastic synthetic foam, for example of polystyrene, polyethylene or polypropylene.

BACKGROUND OF THE INVENTION

According to conventional technique, a thermoplastic resin is melted continuously under pressure in the barrel of an extruder having one or more screws, terminating with an extrusion head having a narrow extrusion orifice which may be flat (for sheets) or circular (for tubes). In an intermediate section of the barrel there is continuously injected into the molten resin a volatile expansion agent, usually in liquid state, for example a "Freon" (R.T.M.) or pentane and the extruder is designed in such a way as to produce a possibly uniform dissolution of the agent in the molten resin. The resin may also contain advantageously suitable nucleating agents, such as, for example, talcum, citric acid and sodium bicarbonate in the form of very fine particles uniformly dispersed in the molten resin. On the way to the extrusion orifice the molten material is subjected to a high pressure, which is necessary to prevent volatilization of the expansion agent. On leaving the extrusion orifice, the material undergoes decompression to atmospheric pressure, as a result of which the expansion agent separates within the material in the form of bubbles, giving rise to the desired foam.

It is known that the quality of the foam thus obtained is heavily dependent on the extrusion temperature. If the extrusion temperature is too high, the foam collapses or, at least, its specific gravity (density) is undesirably high in relation to the value theoretically obtainable, and its mechanical strength is poor. In principle, the higher the percentage of the expansion agent in the molten material, the lower the extrusion temperature should be, since otherwise the viscosity of the resin just extruded is insufficient to resist the disruptive pressure of the gas which is liberated in the resin. Since, in order to obtain foams of low density (less than 0.1 g/cc), substantial percentages of expansion agent are necessary, the problem of lowering of the extrusion temperature assumes great importance.

PRIOR ART

Cooling of the extrusion head is until now resulted insufficient to achive the desired result, mainly because the cellular structure of the foam thus obtaines is coarse and not at all uniform. A method commonly used until now to obtain a uniform cellular structure relies upon cooling of the last section of the barrel of the extruder. For example, the Italian Pat. No. 831,699 (and the corresponding English Pat. No. 1,231,535 and French Pat. No. 1,600,010) describes an extruder for thermoplastic foams comprising at least one injector of the expansion agent into an intermediate zone of the barrel containing the molten material, this zone being followed by a first cooling zone, by means of a water jacket, and by a second (final) zone for cooling by means of a coil fed by a refrigerating system. However, even this intense cooling is insufficient to lower the temperature of the molten material to the level which would be necessary to obtain a low density foam. In fact, as the material travels through the cooled zones its viscosity increases and therefore the frictional heat due to the action of the screw or screws also increases and a steady state is therefore reached in which the temperature of the material no longer decreases, whilst it is still far from the low level desired for the extrusion. This difficulty may be overcome in part by reducing appropriately the speed of rotation of the screws; however, this also reduces the hourly productivity of the extrusion press. Another remedy is to effect the cooling in another extruder, which is fed with the molten mass from the first extruder and in which the screw or screws rotate at low speed. The quality of the foam obtained in this way is acceptable. However, the costs of running the second extruder are only rarely less than that of the first, apart of its high investment cost.

According to U.S. Pat. No. 2,669,751 the molten material supplied by an extruder is conveyed under pressure through a cooled cylinder enclosing an axially extending, internally cooled tubular shaft equipped with a multitude of mixing blades, the discharde end of the cylinder being connected to the extrusion head. However, in practice, it is impossible with this system to have incorporated in the molten flow more than about 7–8% only of the liquid expansion agent and, at the same time, the operational costs are very high due to high power necessary for rotating the bladed shaft under high viscosity conditions of the material.

According to U.S. Pat. No. 3,751,377 synthetic thermoplastic foams of low density (such as 0.026–0.029 g/cc in case of polystyrene) would be obtainable by interposing between the extruder barrel and the extrusion head a "static mixer" or "interface surface generator", previously known as such by being disclosed by a number of prior patents, e.g. U.S. Pat. No. 3,286,992, owing to which it would be possible to successfully process melts containing high proportions expanding agent (10 wt.% and even more). In a "static mixer", which belongs to the general class of mixers having no moving parts, the flow of the melt containing the expanding agent is subdivided into a plurality of partial flows by means of a stationary flow divider and the partial flows are subsequently recombined together under modified contact conditions ("modified" in respect to a contact surface and/or mutual positions of the partial flows); the design and operational conditions of the mixer are such as to possibly accurately avoid turbulent mixing (which latter is characteristic of the non-static mixer belonging to the abovementioned class). In practice, a substantial number (even 20 or more) of dividing/recombining stages is necessary, operating in series in a common tubular casing. The resulting structure is complicate in manufacture, presents a relevant length and a purposely designed supporting system must be provided (in addition to the extruder) to firmly support both the mixer and the extrusion head. It is also a matter of fact that, since laminar-flow conditions must be respected both in the design and operation of a "static mixer", the flow velocity must be kept low by adopting a sufficiently large cross-sectional area of the tubular casing. The consequence is that a great number of stages is necessary to throughly subdivide a flow of material of large cross-sectional area. The prior patents mentioned in the specification of the aforesaid U.S. Pat. No. 3,751,377 show that, in order to increase efficiency of a "static mixer", several forms of flow-dividers were excogitated, with the result that the structure and manufacture became still more complicated than before. Still moreover, presently known "static mixers" do not comprise a cooling jacket or other cooling means but, rather, imply natural dispersion of heat from the inside to the outer atmosphere through the wal of the tubular casing. Experimental tests conducted in connection with the present invention have shown that at least with the static mixer disclosed by U.S. Pat. No. 3,286,992 the temperature of the material flowing through the mixer cannot be controlled at will and, even, the material often tends to heat up by a few °C. instead of cooling down. Further experimental tests, wherein a cooling jacket was added, have shown that, at least with high production rates desirable commercially, the homogeneousness of the foam was unacceptably worsened, most probably because the mixer was unable to adequately intermix the external cool layer of the flow with the hot internal layers.

Summarizing, as far as obtention of low-density extruded thermoplastic foams is concerned, the presently most reliable technique resides in the use of a primary and a secondary extruder in tandem arrangement, in accordance with the aforementioned U.S. Pat. No. 3,151,192 notwithstanding the high investment costs and operating costs.

THE INVENTION

It is an object of the invention to provide a device for cooling the molten material containing the expansion agent, in which the flow of material is efficiently cooled and homogenized with a very low power consumption. An additional object is to provide the said device in a form which is compact, robust and obtainable by simple machining steps rendering the device particularly inexpensive. Yet another object of the invention is to make the said device in a form which may be readily applied to a conventional pre-existing extruder for thermoplastic synthetic foam. Other objects and advantages will emerge from the description which follows.

In accordance with the above, the invention provides an extruder with one or more screws, for thermoplastic synthetic foam, comprising means for injecting into the barrel of the extruder a liquid volatile expansion agent and an extrusion head fed by the barrel with a flow of molten thermoplastic synthetic resin in which is thoroughly dispersed under pressure the said expansion agent, the said extruder being characterised by a device for cooling the said flow of resin, connecting the said head with the said barrel, this cooling devive comprising:

(a)—a cooled metal block, having two opposed faces and at least one row of passages passing through the said block from one to the other of the said faces;

(b)—an inlet manifold channel for the input of the said flow to a first of the said faces and an outlet manifold channel extending from the second of the said faces;

(c)—the said outlet manifold channel being directed at least substantially in the same direction as the row of passages and having one of its lateral walls formed by the said second face of the said block whereby the individual passages in the said row open into the outlet manifold channel transversely to the direction of the latter and in sequence with respect to the said direction; and (d)—at least one cooling channel adjacent the block for cooling the latter by a liquid refrigerant.

Advantageously the inlet manifold channel is also directed at least substantially in the same direction as the said row of passages and has one of its lateral walls formed by the first of the said faces of the block, whereby the individual passages branch off from the said inlet manifold channel transversely to the direction of the latter and in sequence in relation to the said direction. The passages are advantageously of constant circular cross-sectional shape.

In a particularly advantageous embodiment, the length/diameter ratio of the passages does not substantially exceed 10:1, with the result that the pressure drop through the passages is maintained within particularly low values. Furthermore, instead of a single block, the device may comprise a further cooled metal block, in accordance with what has been indicated above under (a), with the respective input and output manifolds according to (b) and (c) and cooling channel according to (d), the outlet manifold channel of the first block being connected to the inlet manifold channel of the second block, whereby a plurality of cooling stages in series with each other is obtained. In each case, according to a particular characteristic of the invention, the overall cross-sectional area of the passages interconnecting an inlet manifold channel with the respective outlet manifold channel is preferably greater than the effective cross-sectional area of the inlet manifold channel, and preferably also than that of the outlet manifold channel.

BRIEF DESCRIPTION OF DRAWINGS

FIG. 2 illustrates in longitudinal cross-sectional view an elementary embodiment of the device;

FIG. 3 is a plan view of one of the cooled blocks used in the device of FIG. 2;

DETAILED DESCRIPTION

Figure 1:
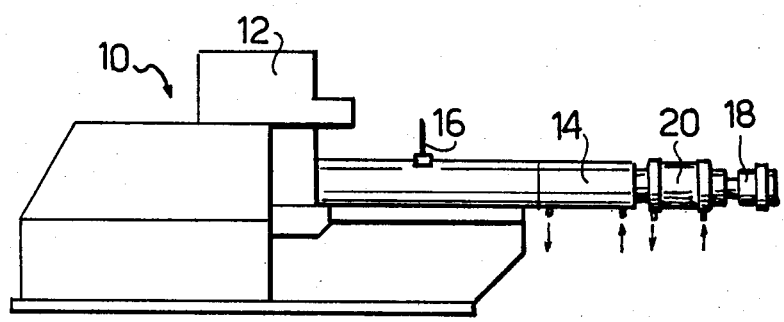
FIG. 1 in the appended drawings illustrates an extruder for thermoplastic foam equipped with one embodiment of the device accordin to the invention.

The extrude 10 illustrated in FIG. 1 comprises a hopper 12 for a granulate of thermoplastic synthetic resin, which latter is brought to molten state under pressure in the extruder barrel 14 containing the screw or screws not illustrated. The present invention is particularly advantageous in application to extruders with two intermeshing screws (in particular with co-rotating screws, according to the so-called "Colombo system"), which have until now been more suitable for obtaining foam of medium density (0.15–0.4 g/cc) and not foams with low density (0.03–0.15 g/cc). An injector 16 leads into an intermediate section of the barrel 14 for the injection of the liquid volatile expansion agent. In this zone the temperature of the molten resin in the barrel considerably exceeds (by as much as 90°–100° C.) the melting point, such that the viscosity of the molten resin is sufficiently low for the purposes of a quick, homogeneous dissolution of the expansion agent. The degree of compression of the resin by the screws in this zone is high and depends mainly on the nature of the agent and on the percentage injected; in general, the pressures involved conveniently are between 200 and 300 kg/sq.cm. A terminal section 14' of the barrel is preferably cooled; to this end it is sufficient to have a simple external oil circulation jackets, if necessary in combination with internal cooling of the screws in this section. In this way the temperature of the molten resin is prereduced to a convenient level, which usually exceeds by 20°–50° C. the desired extrusion temperature, depending on the resin treated and on the expension agent used. By way of an example, in the case of polystyrene with high molecular weight (for example DOW 686) loaded with 7–8% of a 50/50 mixture of "Freon 11" and "Freon 12", the recommendable extrusion temperature seems to be approximately 125° C. With the same polymer, loaded with 7–8% of pentane, the recommendable extrusion temperature appears to be 110° C., whereas in the case of low density polyethylene (e.g. QG1 of Montedison) with 12–14% of "Freon 114" the extrusion temperature should be approximately 100° C. The viscosity values corresponding to these temperatures are practically impossible to obtain in the section 14' of the barrel for the reasons already explained above. With limited pre-cooling, as suggested above, the viscosity of the material in the section 14' reaches only those levels which are still compatible with the mechanical strength of the barrel and of the screws and which in any case correspond to a limited frictional heat, dissipatable by cooling means mentioned. Many commercial extrudes comprise a terminal section of the barrel equipped with cooling means. The extruder RC 41/E of Applicant's Company is an example.

The continuous flow of molten resin thus obtained, with the expansion agent uniformly dissolved in the resin, is fed from the barrel 14 to an extrusion head 18, which presents in a way known per se a narrow extrusion orifice the shape of which is adapted to the foam profile it is desired to obtain. In the particular case which will be looked at in grater detail below, reference will be made to a circular orifice, adapted for the extrusion of a foam tube.

According to the invention, between the extrusion head 18 and the barrel 14 there is interposed a cooling device 20, which is fixed to the free extremity of the barrel and which supports, in its turn, the head 18. The device 20 is a heat exchanger without moving components, to the "cold" side of which there is continuously fed cooling liquid (e.g. oil) at the necessary temperature, and one of the objects of the present invention is to controllably cool with this device the said flow of resin in a thoroughly homogeneous way to a temperature which is possibly close to that of the cooling liquid, that is with high efficiency.

In FIGS. 2 and 3, numeral 22 indicates a flat, rectangular block of a metal which is a good heat conductor, preferably aluminium, having two opposed large faces 22A, 22B parallel with each other. In the block 22 there are drilled parallel rows (A, B, C, D, E) of through holes 24 of circular section, the said holes being at least substantially perpendicular to the said faces and being preferably identical to each other. The block 22 is mounted, in peripherally sealed condition, in a housing 26 in which there is formed all round the perimeter of the block a channel 28 for the circulation of cooling oil. The face 22A of the block 22 constitutes a longitudinal lateral wall of a manifold channel 30, formed in the housing 26, for the inlet flow of molten resin to the block 22. The longitudinal direction of the inlet manifold channel 30 is indicated by the arrow 32 in FIG. 3 and corresponds to the direction of the rows A . . . E of the holes 24. The holes in each of the rows branch off therefore in sequence from the manifold channel 30, transversely to the direction of the latter, that is, in practice, transversely to the flow of resin in the manifold channel. In other words, the flow of resin in the manifold creeps on the face 22A of the block 22 to reach in sequence the individual holes of each of the rows A . . . E. It is preferable if, as illustrated, the width of the manifold channel 30 measured in axial direction of the holes 24 decreases progressively down to zero in the direction of the flow, that is in the direction of the rows A . . . E.

In substantially similar conditions, there extends from the opposite face 22B of the block 22 an outlet manifold channel 34, the longitudinal direction of which corresponds to that of the rows A . . . E and is also indicated by the arrow 32. Thus, the face 22B constitutes a longitudinal lateral wall of the manifold channel 34 and the holes 24 of each of the rows A . . . E open in sequence into this manifold channel transversely to its longitudinal direction. Consequently, in this case too the flow of molten resin in the manifold channel 34 creeps on the face 22B of the block 22, in the direction 32; in these conditions, as is also apparent from the arrows given, the cooled partial flows of resin discharged by the successive holes 24 of each row interfere substantially perpendicularly with the general flow in the manifold channel, giving rise to an effective mixing of the material and therefore to the homogenization of the temperature. The width of the outlet manifold channel 34 measured in direction of the holes 24 increases progressively from zero along the face 22B of the block 22. The "progression" of this increase of the section of the manifold channel 34 is in proportion (more or less) to the flows received from the successive holes in each row, substantially in such a way that the specific flow rate (in g/sec/sq.cm) in any point of the manifold is practically the same. A similar consideration of the whole is valid for the progressive decrease of the section of the inlet manifold channel 30. The "effective" cross-sectional areas of the manifold channel are those which receive the total flow of material and are indicated in FIG. 2 by S1 and S2 respectively. According to the invention it is preferable that the total cross-sectional area of the holes 24 is greater than the cross-sectional area S1, and is preferably greater also than the cross-sectional area S2, such that the total of holes does not constitute a constriction (in terms of area) in the passage of the material from one manifold channel to the other. The diameter of the holes 24 may be selected within a relatively broad range, usually of approximately 3 mm up to about 10 mm, more or less in proportion to the production capacity of the extruder; obviously for particularly high capacities, greater than about 250 kg/hr, diameters greater than 10 mm may be adopted. Since the passage through each hole involves an increase in the viscosity of the resin, which is all the greater the longer is the hole, it is evident that the pressure drop (in kg/sq.cm) produced by the passage through a hole depends to a large extent on the length/diameter (l/d) ratio of the hole, and it is also evident that the greater the pressure drop, the greater would be the power absorbed by the device according to the invention. On the other hand, however, given the presence of the volatile expansion agent in the flow of resin, it is necessary that the device in question should introduce a certain counter-pressure, that is, give rise to a certain presence drop. Practical tests have shown that there exists a range of optimum values for the said counter-pressure, namely between about 15 kg/sq.cm and about 35 kg/sq.cm. This unexpected circumstance is extremely favourable insofar as these values constitute only a small fraction of the counter-pressures (200-300 kg/sq.cm) already necessary in the extruder to produce and maintain the dissolution of the expansion agent in the molten resin, and, therefore, the device according to the invention involves only a correspondingly small increase in absorbed power, so that it may be applied even to a pre-existing extruder without prejudice to the latter. Further experimental tests have demonstrated that, under the circumstances discussed above, the values indicated in the following table are advisable:

| Hole diameter (mm) | l/d | l/d preferred |
|---|---|---|
| 3 | 8-14 | 9-13 |
| 5 | 11-19 | 13-17 |
| 6 | 13-22 | 15-20 |
| 8 | 13-23 | 15-21 |
| 10 | 14-24 | 16-22 |

With these values, the flow of resin may be cooled to a temperature very close to the optimum extrusion temperature. It may also be noted from the above table that for hole diameters exceeding 6 mm the l/d values vary only very slightly.

In practice, however, it is not advisable to use high l/d values with a single cooled block, for example with a block having holes of 6 mm diameter and 120 mm length. It is preferable, instead, to effect the cooling in two stages, that is with two consecutive cooled blocks, realizing jointly the desired l/d ratio. Such a second block is indicated by 22' in FIG. 2 and is identical to the first block 22, the two blocks being coplanar and orientated in the same direction already indicated previously by 32 (FIG. 3). The block 22' sealingly is mounted in the housing 26 previously mentioned and is surrounded by a channel 28' for the circulation of cooling oil. Numerals 22'A and 22'B indicate the two opposed flat faces between which extend the holes 24', analogous to the faces 22A and 22B of the block 22 with the holes 24. The outlet manifold channel 34 connects directly, in the direction 32, with the inlet manifold channel 30' relating to the second block 22', the outlet manifold channel 34' leads off from the face 22'B. For the manifold channels 30', 34' and for their relation to the block 22', the same description applies as has been made with reference to the manifold channels 30, 34 and the block 22. The manifold channel 34' may lead into an extrusion head or connect with the inlet manifold channel of a further cooled block (if necessary). Assuming that there are only two blocks, as illustrated in FIG. 2, the l/d ratio realized by each block is preferably half the selected overall ratio; thus, to realize the ratio 20:1 with holes of 6 mm, each of the blocks 22, 22' will have a thickness of 60 mm.

Figure 5:
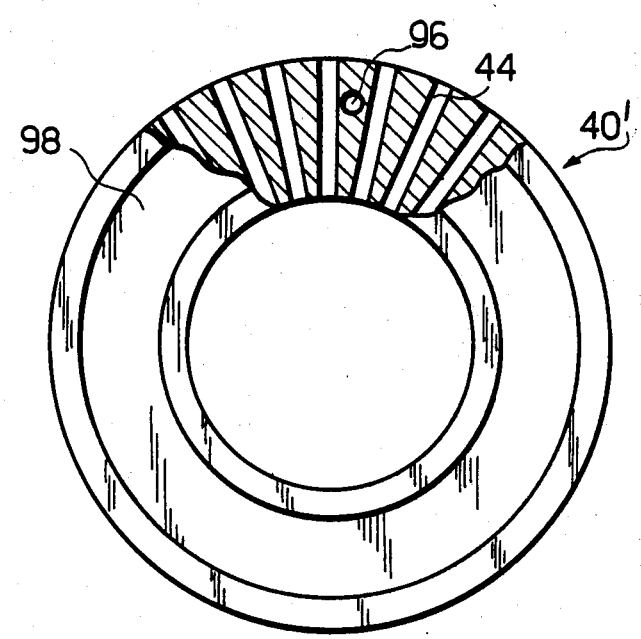
FIG. 5 is a frontal view, partially in cross-section, of one of the cooled blocks used in the device of FIG. 4.

The device according to FIGS. 2 and 3 is particularly useful for small flow rates of resin. For relatively large rates, in particular of 100 kg/hr and more, the embodiment illustrated in FIG. 4 and 5 is preferable.

In this embodiment, a first cooled block is formed by a circular cylindrical sleeve of aluminium, advantageously formed by two rings 40, 40' arranged end to end. Similarly, a second cooled block is formed by a circular cylindrical sleeve of aluminium advantageously formed by two rings 42, 42' arranged face to face. The external cylindrical surfaces of all the rings 40, 40', 42, 42' have the same diameter, for example, 260 mm, and the internal cylindrical surfaces of all the rings have the same diameter, for example 140 mm. The radial thickness of the rings, therefore, amounts to 60 mm, and this is the length of each of the radial holes 44 bored in the rings. Each of the rings has a number of circumferential series of these holes 44; in the case illustrated, each ring has six series of holes, and each series comprises 40 holes equidistant from each other. The diameter of the holes is for example 7 mm, so that the overall area of all the 480 holes in the block 40-40' (and in the block 42-42') amounts to 184.8 sq.cm. The l/d ratio realized by the two blocks is 60/7×2=17.14 and corresponds therefore to the table given hereinbefore. Between the blocks 40-40' and 42-42' there is interposed a circular disc 46, the external diameter of which is equal to that of the rings, and the pile thus formed is centred on the axis X of a tubular casing 48 of circular cross-section, to the ends of which are sealingly bolted two circular head plates 50, 52 which firmly clamp between them the said pile. The head plate 50 has a circular central aperture 50' which connects with the internal cavity of the ring 40, and a tubular hub 50" by means of which the device of FIG. 4 is screwed axially into the section 14' of the extruder barrel of FIG. 1 to constitute the device 20 indicated in the latter Figure. Inside the hub 50" there penetrates radially a thermometric probe 51. Similarly, the head plate 52 has a circular central aperture 52' which connects with the internal cavity of the ring 42', and a tubular hub 52" for screwing into the extrusion head 18 of FIG. 1. A thermometric probe 53 radially penetrates into the hub 52".

From the disc 46 there extend axially towards the apertures 50', 52' two generally conical torpedos 54, 56 respectively. The torpedo 54 defines with the internal cylindrical surface of the block 40-40' a tubular inlet manifold channel 58 of circular cross section, the radial width of which decreases progressively down to zero from the axially external extremity towards the axially internal extremity of the block. Similarly, the torpedo 56 defines with the internal surface of the block 42-42' a tubular outlet manifold channel 60 of circular cross section, tha radial width of which decreases progressively from the axially external extremity towards the axially internal extremity of the block 42-42'. The maximum cross-sectional area of the manifold channels 58, 60 amounts (in the embodiment illustrated) to 98,6 sq.cm, and is therefore less than the overall area (184.8 sq.cm) of the holes in the respective blocks. The internal surface of the casing 48 defines with the radially external surfaces of the rings 40, 40', 42, 42' and of the disc 46 a tubular outlet manifold channel 62 of circular cross section, a tubular inlet manifold channel 64 of circular cross section, and a tubular direct connection 66 between the two manifold channels. The radial width of each of the manifold channels 62, 64 decreases down to zero from the connection 66 towards the axially external extremity of the respective block 40-40', 42-42'. The cross-sectional shape of the connection 66 is constant and has an area of 167 sq.cm, this area too being less than the overall area (184.8 sq.cm) of the holes in the respective blocks.

Figure 4:
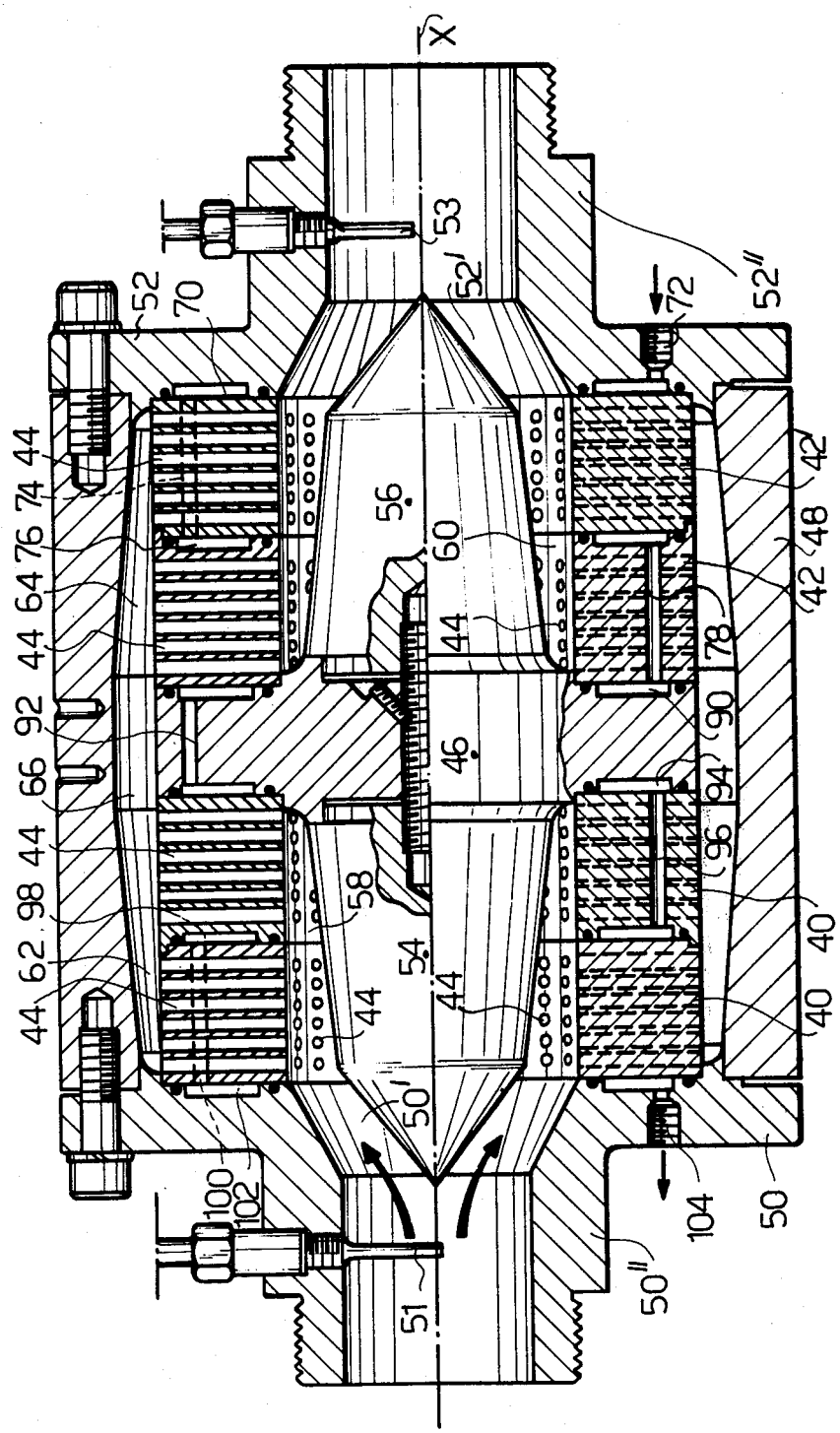
FIG. 4 is an axial cross-sectional view of a device according to the invention in a preferred embodiment.

As may be seen in FIG. 4, analogously to the rows A ... E of the block 22 of FIG. 3, the holes 44 in the four rings 40, 40', 42, 42' of FIG. 4 also form rows (40 rows per block) extending at least substantially in a common direction, parallel to the axis X and comparable with the direction 32 in FIG. 3. In particular, the said holes 44 form fourty rows situated at least substantially in angularly equidistant planes containing the axis of the relevant block. As a result, the material which flows into the device of FIG. 4 undergoes a treatment (cooling and mixing) substantially similar to that already described with reference to FIG. 3.

Within the area of support of the ring 42' against the internal face of the head plate 52 there is formed in this face a circular flat cavity 70, accessible from the exterior through a threaded connection 72. The cavity 70 communicates, through at lest one longitudinal passage 74 in the ring 42', with a similar cavity 76 formed in the ring 42. In its turn, the cavity 76 communicates, through at least one longitudinal passage 78 in the ring 42, with a similar cavity 90 formed in the adjacent face of the disc 46, from which there branches off at least one longitudinal passage 96 communicating with an identical cavity 94 formed in the other face of the disc. The cavity 94 communicates, through at least one longitudinal passage 96 in the ring 40', with an identical cavity 98 formed in the ring 40'. Finally, this latter cavity communicates, through at least one longitudinal passage 100 in the ring 40, with an identical cavity 102 formed in the internal face of the head plate 50 and accessible through a threaded connection 104. Thus, a controllable flow of cooling oil may be fed continuously to the connection 72 to cool the four aluminium rings and then discharged by the connection 104; in this way, the flow of resin is cooled in counter-current, in accordance with the preferred usage of the present invention. The control of the flow of cooling oil is effected under the supervision of the two thermometric probes 51, 53. The probe 51 indicates the temperature reached with the cooling in the final section 14' of the barrel of the extruder (FIG. 1), whereas the probe 53 indicates the final temperature (extrusion temperature). If necessary, two devices of the type illustrated in FIG. 4 may be connected in series to improve the cooling and/or the homogenization, taking into account the fact that the homogenizing effect is produced mainly in the outlet manifold channels 60 and 62 in accordance with the principles described with reference to FIGS. 2 and 3.

EXAMPLE 1

The extruder 10 of FIG. 1 is the Mod.RC 41/E of Applicant's Company, designed for a commercial production of 180–220 kg/h. It is a twin-screw extruder, with co-rotating screws, with l/d ratio of 21/1, with the speed of rotation of the screws controllable from 8.5 to 28 r.p.m. and with a controllable power of between 14 and 50 HP. The section 14' is cooled from the exterior and the lengths of the screws in this section are cooled from the interior. The device 20 applied to the barrel of the extruder is constructed and proportioned in the manner described here with reference to FIGS. 4 and 5. The extrusion head 18 is a conventional non-cooled die for the extrusion of a flat slab of foam with transverse cross section of 500×50 mm. The feed of the extruder consists of granules of TAL (Montedison) polystyrene mixed with a small percentage of citric acid and sodium bicarbonate a nucleants. The extruder is operated at a constant speed of 23 r.p.m. (power 50 HP). The device 20 is cooled with oil at 90° C., oil at the same temperature is also used to cool the section 14'. To the injector 16 there is fed a 50/50 mixture of "Freon 11" and "Freon 12" in a proportion of 12% in weight with respect to the resin. The temperatures indicated by the probes 51, 53 are 140°–142° C. and 120°–122° C. respectively. 220 kg/hour of product are obtained having a density of 0.032 g/cc. The variations of density found at different points of the width of the slab do not exceed 0.001 g/cc. On both faces the slab has a fine, smooth, uniform skin. The power absorbed under these conditions by the device 20 is about 7 HP.

EXAMPLE 2 (Comparative)

The device 20 is removed, the extrusion head 18 is attached directly to the outlet of the section 14' of the extruder, and an attempt is made to operate the extruder in the conditions of Example 1. The product obtained is not uniform, and has cracked and collapsed cells. The extrusion temperature is in the region of 138° C. It is only by reducing the speed of the screws to 16 r.p.m. and the percentage of Freon to 8%, that 150 kg/hour of relatively uniform product are obtained, having a density of between 0.050 and 0.055. The extrusion temperature is 135°–136° C.

EXAMPLE 3 (Comparative)

This test was carried out under the conditions of Example 1, with the difference that the device 20 was replaced by a "static mixer" disclosed by U.S. Pat. No. 3,286,992 having an internal diameter of 8 cm, a length of about 1.9 meters and comprising 14 stages. An extrusion temperature as high as 137°–138° C. was obtained. The power absorbed by the mixer was only about 3 HP, but the foam was unacceptable because of collapsed cells. It was only when the "Freon" proportion was reduced to about 7% that the obtained foam was satisfactorily regular, with a density of about 0.05 g/cc.

EXAMPLE 4 (Comparative)

The test was effected under the conditions of Example 1 with the use of the "static mixer" of Example 3 and with the difference that the mixer was externally cooled by an oil jacket. Oil temperature at the inlet was about 100° C. It was only when the throughput of material was reduced to about 150 kg/hr that the obtained foam exhibited a significant tendency towards an acceptable uniformity of the cellular structure and its density was of the order of 0.035 g/cc.

EXAMPLE 5

The test was effected under the conditions of Example 1, with the difference that the flow rate of the material was reduced to 180 kg/hr and the inlet temperature of cooling oil was lowered to 93° C. An extrusion temperature of 117° C. was obtained and the extruded foam had a uniform density of 0.029 g/cc. This result clearly shows the practical possibilities of the device 20 according to the invention. However, from the commercial point of view, conditions disclosed by Example 1 may be preferable, wherein, even if the foam density amounts to 0,032 g/cc, the production rate is substantially higher.

We claim:

1. In a screw extruder for thermoplastic synthetic foam comprising a barrel, means for injecting into the barrel a liquid volatile expansion agent, and an extrusion head arranged to receive from the barrel a flow of molten thermoplastic synthetic resin in which said volatile expansion agent is thoroughly dispersed under pressure, the improvement comprising a device for cooling said flow of resin, interposed between said head and said barrel, said cooling device comprising:

a housing having a center axis extending between said head and said barrel;

metal block means adapted to be cooled mounted in said housing, having two opposed faces disposed parallel to said axis and at least one axially extending row of passages passing through said block from one to the other of said faces;

said passages being of substantially circular cross-section and a length/diameter ratio which does not exceed approximately 10:1;

an inlet manifold channel in said housing for the input of said flow to a first of said faces and an outlet manifold channel in said housing extending from the second of said faces;

said inlet manifold channel being directed at least substantially in the same direction as said axially extending row of passages and having one of its lateral walls formed by the first of said faces of the block, whereby the individual passages in said row branch off from said inlet manifold channel transversely to the direction of the latter and in sequence with regard to this direction;

said outlet manifold channel being directed at least substantially in the same direction as said axially extending row of passages and having one of its lateral walls formed by said second face of said block whereby the individual passages in said row open into the outlet manifold channel transversely to the direction of the latter and in sequence with respect to this direction; and cooling channel means associated with said block means for cooling said block means by contact with a liquid refrigerant adapted to be carried in said channel means.

2. In a screw extruder according to claim 1, in which said cooling device comprises a further metal block means having inlet and outlet channels constructed and arranged in the manner of said first mentioned block means and channels with the outlet manifold of said first mentioned block means being connected to the inlet manifold channel of said further block means.

3. In a screw extruder according to claim 1, in which the width of the inlet manifold channel, measured in the direction of the respective passages, decreases progressively and in which the analogous width of the outlet manifold channel increases progressively.

4. In a screw extruder according to claim 1, in which the overall cross-sectional area of all the passages interconnecting an inlet manifold channel with a respective outlet manifold channel is greater than the effective cross-sectional area of the inlet manifold channel.

5. In a screw extruder according to claim 4, in which said overall cross-sectional area of all of the passages is also greater than the effective cross-sectional area of the outlet manifold channel.

6. In a screw extruder according to claim 1, in which said metal block means is comprised of at least one circular, cylindrical sleeve and in which said passages are radially disposed and form a plurality of rows situated at least substantially in angularly equidistant planes containing the axis of said sleeve, the end faces of said sleeve adapted to be cooled by said cooling channel means.

7. In a screw extruder according to claim 6, in which said circular, cylindrical sleeve is comprised of at least two rings arranged end-to-end and forming between them a circular cavity coaxial with said sleeve for the circulation of a cooling fluid.

8. In a screw extruder according to claim 6 or 7, in which one of the manifold channels has an annular ring-shaped cross-section and is defined by the radially internal surface of the sleeve and by a torpedo-shaped protrusion extending axially into the sleeve from a first extremity of the latter, the radial width of said one of said manifold channels decreasing down to zero toward said first extremity and in which the other manifold channel is of an annular ring-shaped cross-section and is defined by the radially external surface of said sleeve and by a tubular housing which surrounds said sleeve, the radial width of the other of said manifold channels decreasing down to zero from said first extremity toward the opposite extremity of said sleeve.

* * * * *

UNITED STATES PATENT OFFICE
CERTIFICATE OF CORRECTION

Patent No. 4,222,729      Dated September 16, 1980

Inventor(s) Franco Ragazzini and Roberto Colombo

It is certified that error appears in the above-identified patent and that said Letters Patent are hereby corrected as shown below:

IN THE HEADING:

ADD:

Foreign Application Priority Data

February 23, 1978   Italy ................67373-A/78

Signed and Sealed this

Third Day of February 1981

[SEAL]

Attest:

RENE D. TEGTMEYER

Attesting Officer     Acting Commissioner of Patents and Trademarks